United States Patent [19]

McDonald

[11] 4,278,121
[45] Jul. 14, 1981

[54] ALL-SEASON PNEUMATIC TIRE TREAD

[75] Inventor: Peter McDonald, Hudson, Ohio

[73] Assignee: The Firestone Tire & Rubber Company, Akron, Ohio

[21] Appl. No.: 96,967

[22] Filed: Nov. 23, 1979

[51] Int. Cl.³ .................. B60C 11/06; B60C 11/08
[52] U.S. Cl. .................. 152/209 R; D12/147
[58] Field of Search .......... 152/209 R, 209 A, 209 B,
152/209 NT, 205 WT, 209 D; D12/141,
146-151

[56] References Cited

U.S. PATENT DOCUMENTS

| D. 65,630 | 9/1924 | Braender | D12/146 |
|---|---|---|---|
| D. 201,858 | 8/1965 | Blankenship | D12/147 |
| D. 206,746 | 1/1967 | MacWherter | D12/146 |
| D. 208,014 | 6/1967 | MacWherter | D12/146 |
| D. 214,229 | 5/1969 | Allen | D12/146 |
| D. 223,599 | 5/1972 | Busch | D12/146 |
| 2,534,869 | 12/1950 | Jones | 152/209 R |
| 3,004,578 | 10/1961 | Braudorn | 152/209 R |
| 3,162,229 | 12/1974 | Ellenrieder et al. | 152/209 R |
| 3,177,917 | 4/1965 | Walters et al. | 152/209 R |
| 3,861,436 | 1/1975 | Poque | 152/209 R |
| 3,951,191 | 4/1976 | Suzuki et al. | 152/209 R |
| 4,124,052 | 11/1978 | Beauchamp | 152/209 B |

FOREIGN PATENT DOCUMENTS 2014091 8/1979 United Kingdom .

Primary Examiner—John T. Goolkasian
Assistant Examiner—Lois E. Boland

[57] ABSTRACT

An all-season tire tread having a circumferentially extending central rib together with a plurality of laterally spaced intermittent but circumferentially extending ribs on each side of the central rib with all of these ribs being separated by circumferentially extending grooves wherein a plurality of laterally continuous cleats are placed in circumferentially spaced relation about the tire and extend transversely outward of the central rib toward the closest respective tread edge wherein the circumferential cleat spacing is such that at least two laterally spaced cleats are in contact with the road surface during every footprint of the tire, with a plurality of lateral slots being in communication with the several grooves so as to promote water removal from the footprint area of the tire.

17 Claims, 3 Drawing Figures

ALL-SEASON PNEUMATIC TIRE TREAD

BACKGROUND OF THE INVENTION

1. Field of the Invention

The field of art to which this invention pertains is that of pneumatic tires and more particularly to the tread portion of all-season pneumatic tires. It should be noted that the tread of the present invention can be used on all types of tire constructions, all sizes of tires as well as retreading and centrifugally cast tires.

2. Description of the Prior Art

A current trend in tire design is in the area of "all season" tires wherein the tread design must have good traction in all weather conditions, without compromising snow or wet traction. It should be understood that the design of a specific tread design involves trade-offs between specific tire performance characteristics in order to achieve the overall desired tire performance. For example, a tread design which is basically comprised of lateral bars has the following characteristics: (1) deficient lateral stability in snow; (2) deficient wet pavement traction with the omission of a balance of circumferential grooves; and (3) good forward snow traction. Similarly, tread designs which are basically comprised of circumferential ribs have the following characteristics: (1) deficient forward snow traction; (2) good wet pavement traction with a balance of circumferential grooves; and (3) good lateral stability in snow. In addition, a tire tread design that has good wet or snow traction generally has poor dry traction, poor handling and often excessive noise levels. At the same time a tire tread which generally has good dry traction as well as handling and tread wear characteristically has poor wet and snow traction. Conflicting tire characteristics as these make it difficult to produce a tread pattern suitable for the various road conditions experienced by motorists during the several seasonal changes of an entire year.

The prior art has taken several design approaches relative to all-season tire tread designs, with one approach being that taught in U.S. Pat. No. 3,162,229 to Ellenrieder, et al. and U.S. Des. Pat. No. 223,599 to Busch, et al. which utilize asymmetric tread designs wherein the tire profile changes in the transverse direction but stays constant in a circumferential direction.

U.S. Pat. Nos. 3,004,578 to Braudorn and 3,861,436 to Poque disclose pluralities of adjoining tread sections which extend adjacent to one another in succession circumferentially of the tire wherein each of the adjacent sections differ from one another and impart to the tread various characteristics over their discreet circumferential extents. In another avenue of design, U.S. Pat. No. 2,534,869 to Jones utilizes two separate tread designs that are separated at the circumferential center plane of the tire, one side utilizing parallel ribs while the other side utilizes transverse bars. Similarly, U.S. Pat. No. 3,177,917 to Walters, et al. teaches the superimposition of circumferential and transverse elements to form a slipped plane concept of tread design to retain the desired functional characteristics and at the same time minimize the undesirable characteristics of both elements.

Another prior art all season tire is shown in FIG. 2 of published U.K. patent application No. 2,014,091A and basically utilizes a tread design having a central circumferentially extending rib together with a plurality of independent projections that are placed circumferentially about the tire so as to provide two circumferentially extending grooves, one on either side of the central rib, together with a plurality of lateral slots that extend transversely outwardly from the central grooves to the closest respective tread edge.

With all-season tire tread designs becoming more popular in the market place, it has been determined that the tread arrangement of the present invention which significantly differs from the prior art, is very suitable for use in all seasons and during all weather conditions and provides particularly good snow traction while still maintaining good wet and dry traction, low tread wear and noise levels as well as good handling.

SUMMARY OF THE INVENTION

The tread design of this invention has all of the good features of both of the previously discussed lateral bar tread pattern and the circumferential rib tread pattern and utilizes a maximum number of lateral sipes and slots while producing a minimum amount of wear.

Basically, lateral cleats or bars are utilized to interrupt a normally circumferential multiple rib design so that at least two laterally spaced cleats are in contact with the road surface during every footprint of the tire. Specifically, water flows out of the tire footprint area through partially interrupted circumferential grooves in the shoulder areas of the tire for added wet traction and lateral stability.

In summary, the improved tire tread of the present invention may best be described as utilizing portions of one tread pattern within portions of another tread pattern thereby producing a combination of a multiple rib tread pattern with a central rib/lateral cleat pattern. The improved tread of the present invention includes the use of a circumferentially extending central rib having at least one intermittment but circumferentially extending rib on each side of the central rib and separated therefrom via a continuous circumferentially extending groove on each side of the central rib. In addition, a plurality of laterally continuous cleats are placed in circumferential spaced relation about the tire and extend transversely outward of the central rib to the closest respective tread edge, with the circumferentially spaced relation of the lateral cleats being such that at least one lateral cleat, on each side of the central rib is in contact with the road surface during every footprint of the tire. Preferably, the cleats on opposite sides of the central rib are respectively circumferentially offset in order to ensure superior snow traction.

Other features and advantages of the invention will become more readily understood by persons skilled in the art when following the detailed description in conjunction with the several drawings.

DESCRIPTION OF THE PREFERRED EMBODIMENT

Figure 1:
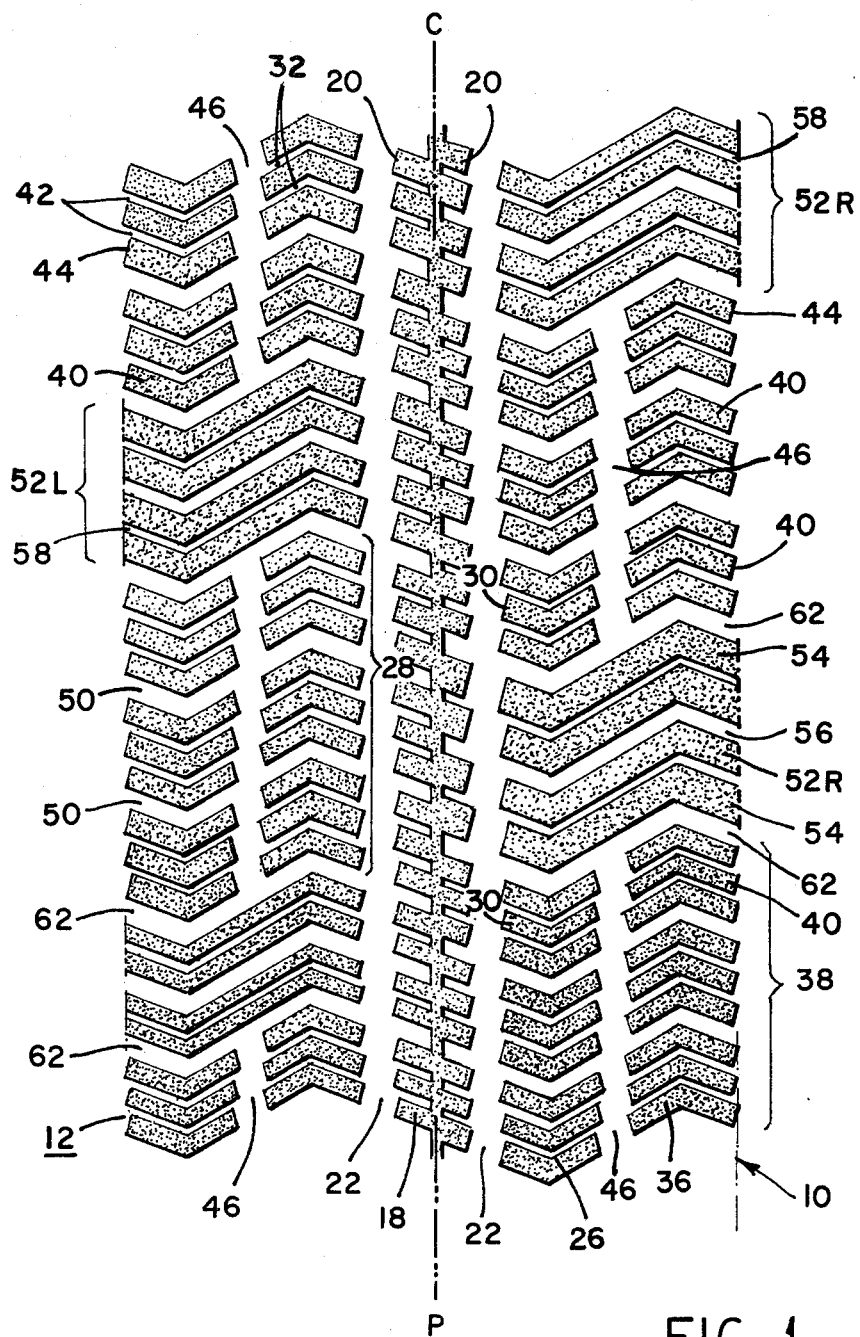
FIG. 1 is a fragmentary plan view of a tread of a pneumatic tire constructed in accordance with the present invention.

Referring now to the drawings, specifically FIG. 1, there is illustrated a fragmentary view of a portion of a tire, generally denoted by reference numeral 10 having a tread portion 12 constructed in accordance with the present invention. It should be understood that the tread portion 12, as shown, is the mirror image of about one footprint of tire 10, with the term footprint being considered that portion of the tire that is in contact with the road surface at any one time. It should further be understood that tread portion 12 extends circumferentially about tire 10 in a like manner.

Figure 3:
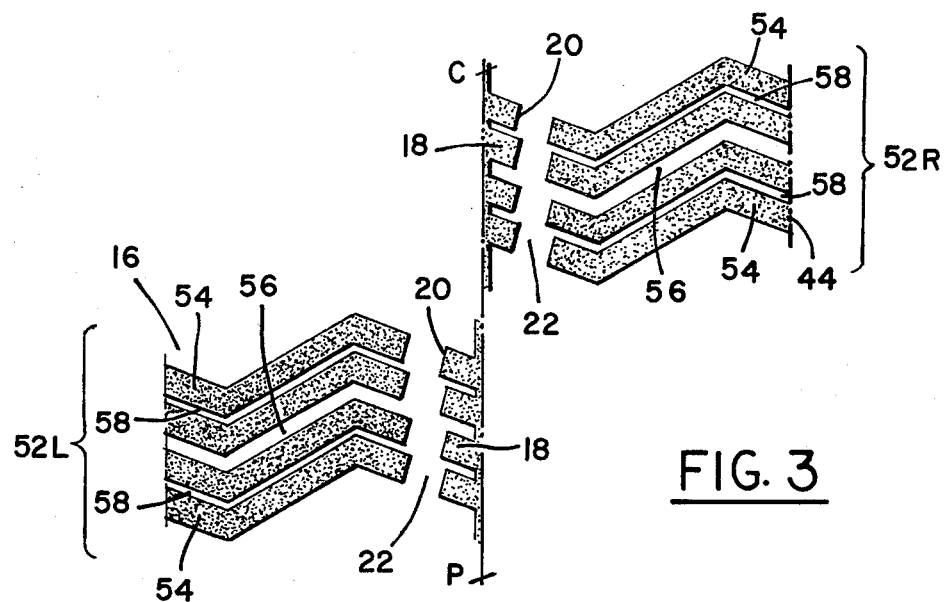
FIG. 3 is a fragmentary plan view of the central rib and cleat tread portion of the present invention.
Figure 2:
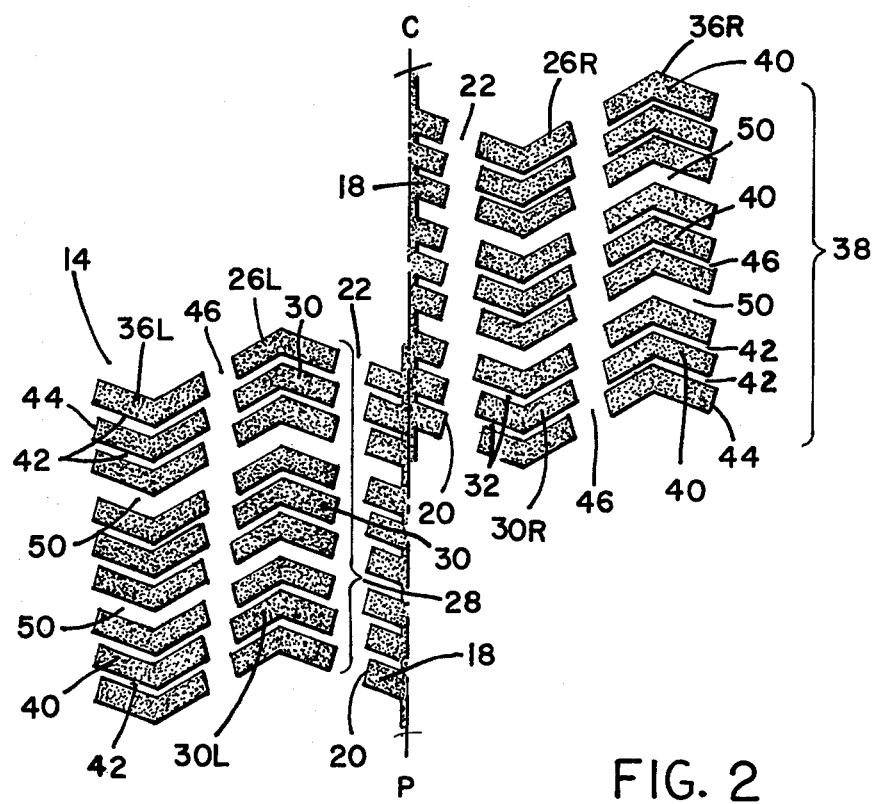
FIG. 2 is a fragmentary plan view of the multiple rib tread portion of the present invention.

Tread portion 12 may best be described as utilizing portions of one tread pattern within portions of another tread pattern, such as the combination of multiple rib tread pattern 14, shown in FIG. 2, with the central rib and lateral tread pattern 16, shown in FIG. 3.

Both tread patterns 14 and 16 utilize a circumferentially extending central rib 18 which, although shown as continuous may have transverse or lateral breaks, notches, or other features which extend continuously axially across rib 18, with rib 18 being located substantially in the central portion, e.g., straddling the mid-circumferential center plane CP of the tire in both tread patterns 14 and 16. Similarly, in both tread patterns 14 and 16, adjacent the transverse edges 20 of central rib 18, are continouous circumferentially extending grooves 22.

Turning now to FIGS. 1 and 2, laterally spaced from central rib 18 and adjacent to the outer walls of grooves 22 are discontinuous but fully circumferentially extending intermediate ribs 26L and 26R (L and R hereafter representing left and right relative to mid-circumferential center plane CP). It should be understood that further discussions relative to element 26 (or other elements having similar L and R suffixes) are equally applicable to 26L and 26R unless otherwise noted. Intermediate ribs 26 are made up of circumferentially spaced repeating portions 28 which in turn include multiple segments 30. For example, as shown in FIG. 2, three multiple segments 30 make up one repeating portion 28 of intermediate rib 26. Each segment 30 may include one or more sipes 32 and preferably takes a chevron or V shape whose apex lies in a circumferential plane parallel to mid-circumferential center plane CP. In addition, preferably the apexes of segments 30L and 30R point in opposite circumferential directions.

Spaced transversely outwardly of intermediate ribs 26 are discontinuous but fully circumferentially extending ribs 36L and 36R, with ribs 36 consisting of circumferentially spaced repeating portions 38 that include multiple segments 40. Preferably, each segment 40 includes a plurality of transverse sipes 42, with segments 40 preferably being in the general shape of chevrons who apexes lie in a circumferential plane parallel with circumferential center plane CP. It should be noted that segments 40 of outer ribs 36 are very similar to segments 30 of adjacent intermediate ribs 26 with the exception that their apexes point in the opposite circumferential direction.

The outer angular end walls 44 of rib segments 40 basically define the respective tread edges of tire 10, with intermediate ribs 26 and outer ribs 36 being so placed as to provide a discontinuous partly-circumferentially extending groove 46 therebetween.

As best seen in FIGS. 1 and 2, multiple rib segments 30 and 40 are so circumferentially spaced so as to permit a plurality of lateral slots 50 to extend from each circumferentially extending groove 22 transversely outward to the nearest respective tread edge 44. Lateral slots 50 extend from grooves 22 to tread edges 44 in a substantially uninterrupted manner. In addition, slots 50 are also in communication with grooves 46 so as to improve water removal from the contact or footprint area of the tire. Water removal is enhanced via the substantially transverse outward direction of slots 50 relative to central rib 18 and tread edges 44.

Turning now specifically to FIGS. 1 and 3, the latter specifically shows tread pattern 16 as consisting of previously-described central rib 18 and a plurality of continuous lateral cleats or bars 52 placed in circumferentially spaced relation about tire 10 transversely outward of central rib 18 and extending laterally outward from grooves 22 to the closest respective tread edge 44 of the tire. Each lateral cleat or bar 52L and 52R preferably includes multiple segments 54 which may be separated by a lateral slot 56 and also preferably have one or more lateral sipes 58. The shape and orientation of cleats 52 is such that they can be thought of as a combination of adjacent rib segments 30 and 40, if those segments were elongated and connected across grooves 46. Looking at it another way, cleat segments 54 could be transformed into rib segments 30 and 40 by extending grooves 46 circumferentially through cleat segments 54.

Looking now specifically at FIG. 1, it will be noted that the placement of lateral cleats 52 relative to adjacent rib segments 30 and 40 is such to produce a plurality of adjacent lateral slots 62 extending from central grooves 22 transversely outwardly to tread edges 44. Slots 62, similar to lateral slots 50 which are also in communication with grooves 46, again enhance the water removal capabilities of tire tread portion 12.

It should be clear, at this time, from the drawings, that cleats 52L and 52R as well as rib portions 28R, 38R and rib portions 28L, 38L are circumferentially offset or staggered relative to one another so that cleats 52R and 52L, for example, are preferably not transversely aligned. Although this circumferential offset is not mandatory it enchances the traction capability of tread 12. Cleats 52 are so placed, relative to ribs 26 and 36, that during every footprint of tire 10 at least one each of laterally spaced cleats 52L and 52R is in contact with the road, with preferably no more than three cleats 52L and three cleats 52R being in contact with the road during one footprint of tire 10. The circumferential extent of one cleat 52 preferably is about one-half of the circumferential extent of one of rib portions 28 or 38.

From the foregoing, it is believed that those familiar with the art will readily recognize and appreciate the novel concepts and features of the present invention. Obviously, while the invention has been described in relation to only one embodiment, numerous variations, changes and substitutions and equivalents will present themselves to persons skilled in the art and may be made without necessarily departing from the scope and principles of this invention. As a result, the embodiment described herein is subject to various modifications, changes and the like, without departing from the scope and spirit of the invention, with the scope thereof being determined solely by reference to the claims appended hereto.

What is claimed is:

1. A tread for a pneumatic tire comprising:
   (a) a circumferentially extending central rib;
   (b) an intermediate intermittent and an outer intermittent but circumferentially extending rib on each side of said central rib, said intermediate rib being placed so as to provide two continuous circumferentially extending grooves, one on each side of said central rib;

(c) a plurality of laterally continuous cleats placed in circumferentially spaced relation about the tire transversely outward of said central rib and extending laterally outward to the closest respective tread edge, said circumferentially spaced relation of said lateral cleats being such that at least two laterally spaced cleats are in contact with the road surface during every footprint of said tire;

(d) said lateral cleats and intermittent ribs being so placed as to provide a lateral slot adjacent to each of said lateral cleats extending from each of said circumferential grooves laterally outward to the closest respective tread edge;

(e) said intermediate and outer ribs being so placed as to provide a discontinuous partly-circumferentially extending groove therebetween, said latter groove being in communication with said lateral slots adjacent said cleats; and (f) each of said intermittent ribs having circumferentially spaced portions including multiple segments, said segments being so circumferentially spaced as to provide a plurality of lateral slots extending from each of said circumferentially extending grooves transversely outward to the closest respective tread edge.

2. A tire tread according to claim 1 wherein said cleats on one side of said central rib are circumferentially offset relative to the cleats on the other side of said central rib.

3. A tire tread according to claims 1 or 2 wherein said circumferentially spaced relation of said cleats is such that no more than three cleats, on each side of said central rib, are in contact with the road surface during every footprint of said tire.

4. A tire tread according to claim 1 wherein each of said lateral cleats includes multiple segments.

5. A tire tread according to claim 4 wherein said multiple segments are so circumferentially spaced as to provide a lateral slot extending from said circumferentially extending grooves transversely outward to the closest respective tread edge.

6. A tread for a pneumatic tire comprising:
(a) a circumferentially extending central rib;
(b) an intermediate intermittent and an outer intermittent but circumferentially extending rib, of circumferentially spaced portions including multiple segments, on each side of said central rib, said intermediate rib being placed so as to provide a circumferentially extending groove on each side of said central rib;
(c) a plurality of continuous lateral cleats placed in circumferentially spaced relation between said portions of said discontinuous ribs, said cleats extending laterally outward to the closest respective tread edge, said circumferentially spaced relation of said cleats being such that during every footprint of said tire at least two laterally spaced cleats are in contact with the road, said cleats and discontinuous ribs being placed so as to provide a lateral slot adjacent to each of said cleats extending from each of said circumferential grooves outward to the closest respective tread edge;
(d) said intermediate and outer ribs being so placed as to provide a discontinuous partly-circumferentially extending groove therebetween, said latter groove being in communication with said lateral slots adjacent said cleats; and
(e) said multiple rib segments being so circumferentially spaced as to provide a plurality of lateral slots extending from each of said circumferentially extending grooves transversely outward to the closest respective tread edge.

7. A tire tread according to claim 6 wherein said cleats on one side of the central rib are circumferentially offset relative to said cleats on the other side of said central rib.

8. A tire tread according to claims 6 or 7 wherein said circumferentially spaced relation of said cleats is such that no more than three cleats on each side of said central rib are in contact with the road surface during every footprint of said tire.

9. A tread for a pneumatic tire comprising:
(a) a circumferentially extending central rib;
(b) a first discontinuous but fully circumferentially extending rib, of circumferentially spaced portions including multiple segments, on each side of said central rib and placed so as to provide a circumferentially extending groove on each side of said central rib;
(c) a second discontinuous but fully circumferentially extending rib, of circumferentially spaced portions including multiple segments, transversely outwardly of each of said first discontinuous ribs and so placed as to have its lateral outer edges form the respective tread edges of the tire and inner edges laterally spaced from the outer edges of said first discontinuous rib;
(d) certain ones of said adjacent but laterally spaced segments of said first and second discontinuous ribs being connected, thereby producing a plurality of circumferentially spaced continuous lateral cleats, said cleats extending laterally outward to the closest respective tread edge, said circumferentially spaced relation of said cleats being such that during every footprint of said tire at least two laterally spaced cleats are in contact with the road;
(e) said lateral cleats and discontinuous ribs being so placed as to provide a lateral slot adjacent to each of said lateral cleats;
(f) said multiple rib segments being so circumferentially spaced as to provide a plurality of lateral slots extending from each of said circumferentially extending grooves transversely outward to the closest respective tread edge; and
(g) said first and second discontinuous ribs are so placed as to provide a discontinuous partly-circumferentially extending groove therebetween, said latter groove being in communication with said lateral slots extending across said rib segments.

10. A tire tread according to claim 9 wherein said cleats on one side of said central rib are circumferentially offset relative to said cleats on the other side of said central rib.

11. A tire tread according to claims 9 or 10 wherein said circumferentially spaced relation of said cleats is such that no more than three cleats, on each side of said central rib, are in contact with the road surface during every footprint of said tire.

12. In a tread for a pneumatic tire of the type having a circumferentially extending central rib and a plurality of successively laterally spaced parallel discontinuous but circumferentially extending ribs, made up of multiple segments, on each side of said central rib, wherein all of said ribs are separated by circumferentially extending grooves, the improvement comprising:
- (a) the connection of certain adjacent but laterally spaced segments of said discontinuous ribs, on each side of said central rib, to produce a plurality of circumferentially spaced continuous lateral cleats extending laterally outward of the circumferentially extending grooves on each side of said central rib toward the closest respective tread edge, said circumferentially spaced relation of said lateral cleats being such that at least one lateral cleat, on each side of said central rib, is in contact with the road surface during every footprint of said tire;
- (b) said multiple rib segments being so circumferentially spaced as to provide a plurality of lateral slots extending from each of said circumferentially extending grooves transversely outward to the closest respective tread edge;
- (c) said lateral cleats and discontinuous ribs being so placed as to provide a lateral slot adjacent each of said lateral cleats; and
- (d) said discontinuous ribs being so placed as to provide a discontinuous partly-circumferential groove therebetween, said latter groove being in communication with said lateral slots adjacent said cleats.

13. The improved tire tread of claim 12 wherein said cleats on one side of said central rib are circumferentially offset relative to said cleats on the other side of said central rib.

14. The improved tire tread of claims 12 or 13 wherein said circumferentially spaced relation of said cleats is such that no more than three cleats, on each side of said central rib, are in contact with the road surface during every footprint of said tire.

15. In a tread for a pneumatic tire comprising the combination of portions of a first tread pattern having a circumferentially extending central rib and pluralities of successively laterally spaced parallel circumferentially extending ribs on each side of said central rib, with portions of a second tread pattern having a circumferentially extending central rib and a plurality of laterally continuous bars placed in circumferentially spaced relation about the tire transversely outward of said central rib and extending to the closest respective tread edge, the improved combination comprising:
- (a) a circumferentially extending central rib;
- (b) a plurality of successively laterally spaced parallel circumferentially extending rib portions separated from each other by partly-circumferentially extending grooves;
- (c) a plurality of circumferentially spaced continuous lateral bars separating said rib portions, said bars on one side of said central rib being circumferentially offset relative to said bars on the other side of said central rib such that at least one lateral bar, on each side of said central rib, is in contact with the road surface during every footprint of said tire;
- (d) each of said parallel rib portions including multiple segments, said segments being so circumferentially spaced as to provide a plurality of lateral slots that extend from said central rib transversely outward to the closest respective tread edge, said lateral slots also being in communication with said partly-circumferentially extending grooves; and
- (e) said lateral bars and parallel rib portions being so placed as to provide a lateral slot adjacent each of said lateral bars.

16. The improved tire tread combination of claim 15 wherein said circumferential spaced relation of said bars is such that no more than three bars, on each side of said central rib, are in contact with the road surface during each footprint of said tire.

17. The improved tire tread combination of claim 15 wherein each lateral bar includes multiple segments, said bar segments being so circumferentially spaced as to provide a lateral slot that extends from said circumferentially extending grooves transversely outward to the closest respective tread edge.

* * * * *